April 11, 1967 N. C. THUESEN 3,313,278
VALVE PORT PASSAGES AND THE ARRANGEMENT THEREOF IN ENGINES
Filed Sept. 15, 1965 2 Sheets-Sheet 1

INVENTOR.
NIEL C. THUESEN
BY C. G. Stratton
ATTORNEY

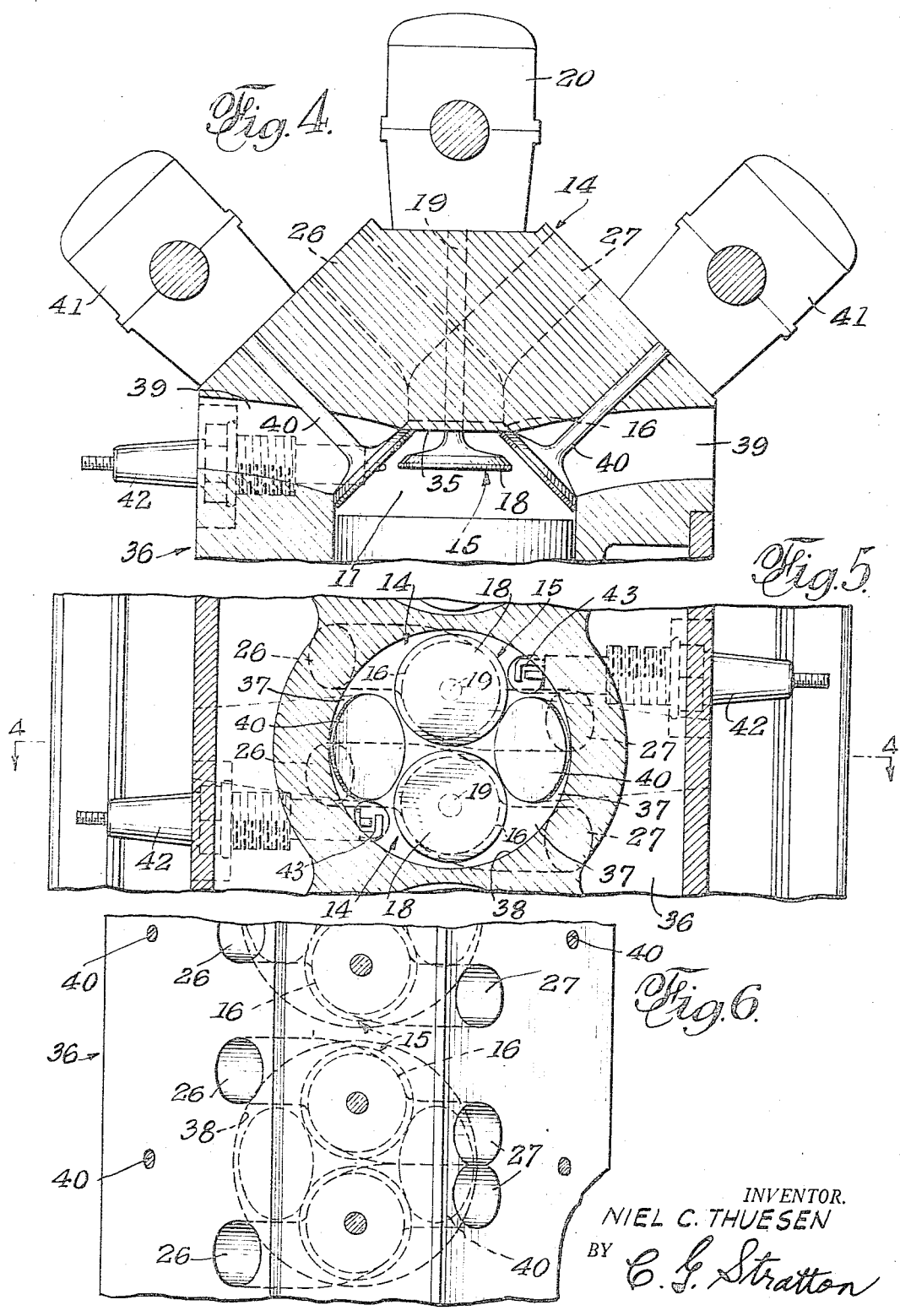

United States Patent Office 3,313,278
Patented Apr. 11, 1967

3,313,278
VALVE PORT PASSAGES AND THE ARRANGE-
MENT THEREOF IN ENGINES
Niel C. Thuesen, 6021 Compton Ave.,
Los Angeles, Calif. 90001
Filed Sept. 15, 1965, Ser. No. 488,835
3 Claims. (Cl. 123—75)

This invention relates to a valve port for the valves of internal combustion engines, compressors and like machines, and to the flow passages related thereto. The invention also deals with the arrangement of the above in internal combustion engines.

In structures having valves to control flow into and out of a cylinder, said valves are provided with stems by means of which the same are moved, as by tappets, cams or like means. The passages leading to the ports controlled by such valves are necessarily directed to clear the valve-moving means and, therefore, have a bend or bends therein. Since the molecules of a flow of air, carbureted air, or exhaust gases tend to flow in a straight line under the pressures to which they are subjected, the same leave the inside of any bend in passage and flow to and strike against the outside of the bend in the passage. As a consequence, at the bend the flow becomes crowded against the outside and is correspondingly sparser at the inside of the bend.

Since most valve ports are disposed just beyond such a bend in the flow passage to save space and also to obviate providing the valves with unnecessarily long stems, there is no space available to extend the passage beyond the bend so the crowding above mentioned may be corrected. Accordingly, the flow through the valve port is non-uniform, most of the flow crowding into the port on one side of the valve seat opening and thereby being slowed considerably. Also, since the valve stem is in the middle of the flow, it disturbs and impedes the flow. The flow, therefore, is quite inefficient in that the full areal size of the valve seat opening is not used, and because of the turbulences caused by such crowding and impedance.

A reverse flow of such an arrangement is also inefficient, because it makes effective use of only a portion of the valve seat opening area.

Accordingly, an object of the present invention is to provide a valve port and passage arrangement that by minimizing turbulences, provides for a substantially unimpeded and rapid flow through the valve port into the cylinder served by the valve.

Another object of the invention is to provide a port and passage arrangement in which the major portion of the areal extent of the valve seat opening is used for the flow, whether on intake or exhaust, to speed the flow in either direction.

Further objects of the invention are to provide a valve port and passage arrangement that, by increasing and speeding flow under operating conditions, improves the efficiency of engines, and which is adapted to be embodied in existing engine design to increase flow capacity, and that provides for increased engine torque over a wider range of speed.

The valve port passage means, as above characterized, not only have improved air supply efficiency, but also provide for a compact arrangement in an engine block, whereby two intake valve ports, each with two intake passages as contemplated, are so grouped with relation to each engine cylinder that weight, size and space factors of an engine embodying the same are materially improved over existing designs. A still further object of the invention is to provide such an arrangement of valve ports and passages.

A general and further object of the invention is to provide a compact valve port passage means that provides high volumetric efficiency over wide engine speed ranges.

This invention also has for its objects to provide such means that are positive in operation, convenient in use, easily installed in a working position and easily disconnected therefrom, economical of manufacture, relatively simple, and of general superiority and serviceability.

The above objects are realized in valve port passage means that comprises a valve port that is coaxial with the stem and disc of a lift or poppet valve, with the seat on the end of said port controlled by said valve disc and two passages extending from said port, each approximately half the area of the port, and each of which is offset from the axis of said stem, said passages including an angle between them such that the flow between each passage and the port follows an approximately straight path that has minimum contact with the valve disc, when the latter is in spaced, open relation to the seat of said port. Said passages are partly lapped on each other where they approach the port, the lap being mainly where the valve stem is located, the latter, thereby, being disposed only in the path of adjacent portions of the flow in the passages, thus having minimum impedance to the straight-line flow in the unlapped portions of the passages. The two substantially independent flows enter and pass through the port with minimum turbulence, this smooth flow being aided by the fact that the capacity of the port is approximately the same as the combined flow capacity of the passages. Finally, the passages approach the port at opposite angles so that the flow from the passages does not enter the port normal to the axis of the valve, but rather at an angle, according to the mentioned included angle, that directs the flow from each passage to the space between the valve seat and the open valve disc with minimum turbulence contact with said disc. Thus, flow into the cylinder served by said valve, not being impeded nor subject to undue friction, is rapid and efficient.

The present offset axis arrangement of flow passages affords a divided flow that enables more effective use of the cylinder area and a more symmetrical and uniform flow pattern of air or fuel into the cylinder. This improved efficiency is primarily the result of a low turbulence flow from the two oppositely offset passages.

The objects are also realized in an arrangement of two intake valve port passage means, as above, in a clustered arrangement with relation to an engine cylinder, together with two exhaust ports, that has the valves and the ports and passages of the two intakes in side-by-side relation, and the exhaust ports in oppositely angled relation to each other and in a plane that symmetrically divides the cylinder with one intake valve on each side of said plane. Ignition for a combustible charge in said piston is provided by spark plugs opening into said cylinder at a point or points between each of the intakes and exhausts.

The arrangement of the mentioned exhaust ports or valves is such that they lie in an axial plane of the cylinder and are perpendicular to the plane on which the side-by-side intake valves lie. Said exhaust valves are oppositely inclined to the cylinder axis, providing the end wall of the combustion chamber of the cylinder with increased areal size, enabling the provision of larger exhaust valve ports than cylinders having end walls that are normal to the cylinder axis. More efficient scavenging flow patterns and resultant reduction of detonation and achievement of uniform heat distribution are results of the above arrangement and grouping of the intake and exhaust ports.

While the charge enters the cylinder at the desired unimpeded speed and with minimum turbulences, as above explained, the turbulence necessary for best combustion occurs after the charge is received in the cylinder. To this end, the cylinder is provided with two oppositely inclined surfaces that correspond to the angle of the exhaust valves and are separated at the nearer portions by the surface that is normal to the axes of the intake valves and the axis of the cylinder. This arrangement of cylinder walls or surfaces squeezes the charge of fuel from the sides toward the center of the cylinder toward the intake valves, creating desired turbulence in the combustion chamber. The charge is thus compressed against the relatively cool closed intake valve. By placing the spark plugs in diameterally opposed relation adjacent the exhaust ports, the charge is ignited in warmer areas of the combustion chamber, the flames of combustion travelling evenly toward the cool area from both sides. Reduced detonation and efficient combustion are provided by the above.

The invention also comprises novel details of construction and novel combinations and arrangements of parts, which will more fully appear in the course of the following description, and which is based on the accompanying drawings. However, said drawings merely show, and the following description merely describes, preferred embodiments of the present invention, which are given by way of illustration or example only.

In the drawings, like reference characters designate similar parts in the several views.

FIG. 4 is a cross-sectional view of the head of an engine showing the means illustrated in FIGS. 1, 2 and 3 in operative relationship with another such means and with exhaust ports, all serving one cylinder of an internal combustion engine.

FIG. 5 is a plane sectional view thereof as seen from the bottom of FIG. 4.

FIG. 6 is a plan view of a modification, valve gear and spark plugs being omitted.

Figure 1:
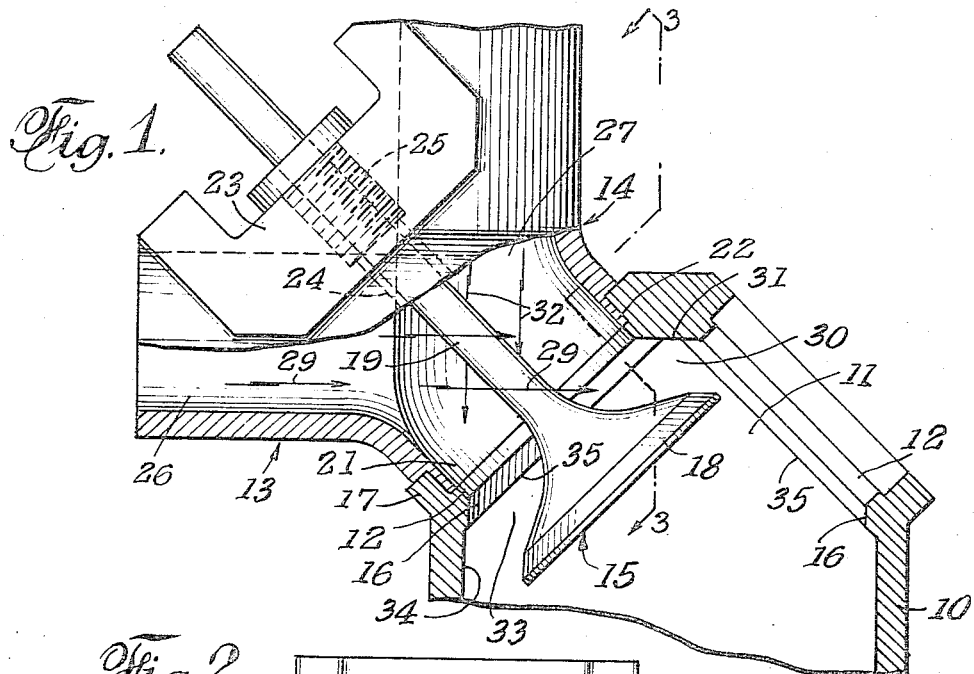
FIG. 1 is a longitudinal sectional view, partly in elevation, of means embodying the present valve port and passage means as an intake assembly, and shown in operative position on a cylinder.
Figure 2:
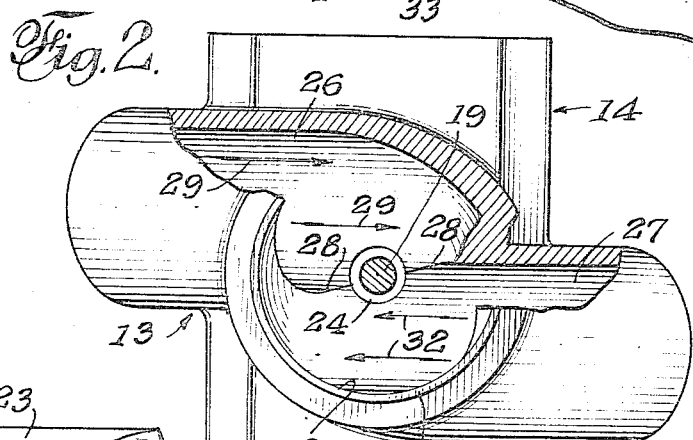
FIG. 2 is an end elevational view as seen from the port end of the means shown in FIG. 1.
Figure 3:
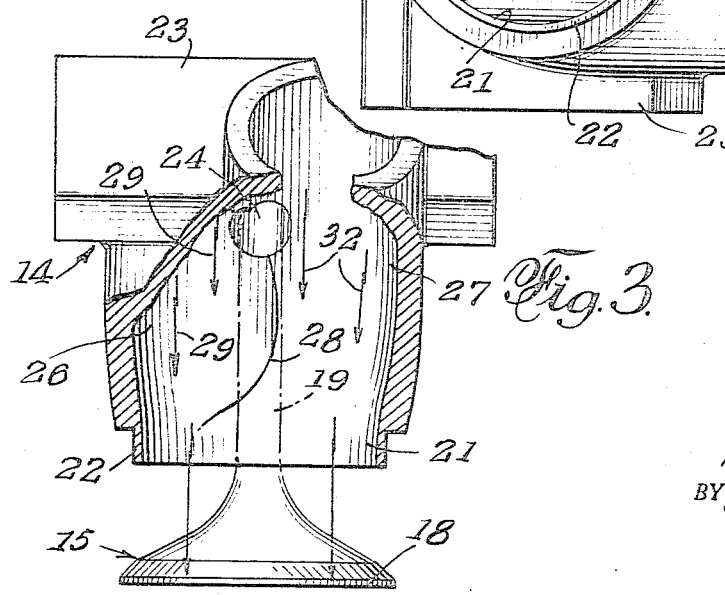
FIG. 3 is a vertical sectional view as taken on the line 3—3 of FIG. 1.

FIGS. 1, 2 and 3 show a cylinder 10 that has a combustion chamber 11 into which two port openings 12 open. Ordinarily, both said openings are fitted with valve and passage means. This view, however, shows but one unit 13, which combines port and passage means 14, and a valve 15 for controlling flow between said chamber 11, the opening 12, and the means 14.

As is common practice, each opening 12 is provided with a valve seat 16 which, in this case, is formed with an outer collar portion 17 into which the unit 13 is fitted. Means, not shown, is provided to secure said unit 13 in operative position.

The valve 15 is provided with a disc 18 to fit against and close the port opening 12, a stem 19 extending from said disc through said opening. Valve gear means 20, suggested in FIG. 4, is provided to engage said stem 19 to cause reciprocative movement of the valve 15 relative to its valve seat 16.

The combined port and passage means 14 is shown as a body or casting having a circular port 21 that is encircled by a flange 22 that fits the collar portion 17 of the valve seat 16. Said casting is formed with a portion 23 that has a bore 24 in which a fitting 25 is disposed and which forms a guide for the valve stem 19. It will be clear that the port 21 and the valve disc 18 are coaxial and that seating of said disc on the seat 16 closes said port.

The means 14 further comprises two passages 26 and 27 that are the same size and are smaller diametrally than the port 16. As seen best in FIGS. 2 and 3, said passages 26 and 27 are offset on opposite sides of the axis of the port 21 and, where the same blend into the port, are in lateral communication, as shown by the line 28. Said passages 26 and 27 extend at approximate right angles to each other and each at an angle of approximately 45° to the axis of port 21. Therefore, each passage 26 and 27 embodies a bend of approximately 135°, the bends being in communication.

As can be seen from FIGS. 1, 2 and 3, the flows of air or fuel along passage 26 follow the path of arrows 29, and substantially the entire flow follows a straight path that is on one side of the valve stem 19 and is directed into the cylinder chamber 11 through a space 30 between the valve disc 18 and adjacent portions 31 of the chamber walls. A similar straight flow along the passage 27 follows the path of arrows 32 on the opposite side of valve stem 19, and is directed into the cylinder chamber 11 through a space 33 between the valve disc 18 and the adjacent portions 34 of the cylinder bore. It will be clear that said two flows, before they leave the passage means 14, have minimal interference and, therefore, reach the spaces 30 and 33 substantially unimpeded and, therefore, at maximum speed. Only then, under compression by a piston in cylinder 10, will this dual charge become subjected to the turbulences induced by any sloping faces of chamber 11. In FIG. 1, the faces 35, in which the seats 16 are formed, are such faces since the same serve to converge and compress the charge into the top of chamber 11. This turbulence occurs only after the charge has entered the cylinder.

In FIGS. 4, 5 and 6, the combined port and passage means 14 is incorporated in an engine block 36 having cylinder bores 10 in which the combustion chambers 11 have converging faces 37 that have the same purpose as faces 35, to compress and converge a charge in said chamber 11. In this case, two means 14, in side-by-side relation, are provided, the valve 15 serving each said means being disposed with the stem 19 thereof parallel to and on one side of the axis of said cylinder. The discs 18 of said valves, as can be seen in FIG. 5, with suitable clearance from each other and from the cylindrical wall 38 of the cylinder 10, have a symmetrical arrangement on each side of the cylinder axis.

The mentioned converging faces 35 that compress the charge in the chamber 11 are symmetrically arranged on either side of said plane. It is in these faces 37 that exhaust ports 39 open, the same being confined within the area circumscribed by the wall 38 and, on each side, nesting within said wall and between the seats 16 of the means 14.

The passages 26 and 27 are offset, as described. They may all be offset in the same direction, as in FIG. 5, or alternately in opposite directions, as in the modification of FIG. 6.

The valves 40 that control the ports 39 under control of valve gear 41 have the same characteristics as the valves 15 and preferably are of the same size for maximum scavening efficiency.

As hereinbefore indicated, ignition for the compressed charge in chamber 11 is had by means of spark plugs 42, the electrodes 43 of which open to the faces 37 along which the charge compression takes place.

It will be clear from the forms of the invention illustrated, especially as shown in FIGS. 2 and 3, that no portion of either passage 26 or 27 extends beyond any portion of the other passage. As can best be seen from the line 28 in said latter views, lap of the two passages is contained within the projected diameter of the valve stem 19. Thus, said stem, due to the opposite curvature of the sides contacted by the flows in passages 26 and 27, prevents flow from one passage from spilling over into the other, thereby insuring that the flows will follow the respective paths of arrows 29 and 32.

While the foregoing has illustrated and described what are now contemplated to be the best modes of carrying out the invention, the construction is, of course, subject to modification without departing from the spirit and scope of the invention. Therefore, it is not desired to restrict the invention to the particular forms of construction illustrated and described, but to cover all modifications that may fall within the scope of the appended claims.

Having thus described the invention, what is claimed and desired to be secured by Letters Patent is:

1. In an engine:
   (a) a cylinder having a combustion chamber defined by oppositely angled converging faces and a top face between the nearer portions of the converging faces,
   (b) two intake port and passage means in side-by-side relation on a plane on the axis of the cylinder and through the center of said top face,
   (c) each said means including a valve having a disc and guide means for the stem of said valve,
   (d) a valve port coaxial with the stem and the disc of the valve, and
   (e) two substantially straight passages extending from said port, each passage being offset from the axis of the valve stem,
   (f) the passages of each said means being lapped and the lap being less than the diameter of the stem of the valve controlling flow in said passages.

2. In an engine:
   (a) a cylinder having a combustion chamber defined by oppositely angled converging faces and a top face between the nearer portions of the converging faces,
   (b) two intake port and passage means in side-by-side relation on a plane on the axis of the cylinder and through the center of said top face,
   (c) an exhaust port in each of the converging faces on a plane normal to the mentioned plane, and
   (d) an exhaust valve to control each exhaust port.

3. In an engine:
   (a) a cylinder having a combustion chamber defined by oppositely angled converging faces and a top face between the nearer portions of the converging faces,
   (b) two intake port and passage means in side-by-side relation on a plane on the axis of the cylinder and through the center of said top face,
   (c) an exhaust port in each of the converging faces on a plane normal to the mentioned plane,
   (d) an exhaust valve to control each exhaust port, and
   (e) two spark plugs having their electrodes extending through the converging walls to the combustion chambers.

References Cited by the Examiner

UNITED STATES PATENTS

| 2,338,959 | 1/1944 | Nallinger et al. | 123—191 |
| 2,669,984 | 2/1954 | Marchal et al. | 123—188 |
| 2,804,862 | 9/1957 | Nedwidek | 123—191 X |

FOREIGN PATENTS

| 159,338 | 10/1954 | Australia. |
| 1,129,970 | 10/1956 | France. |

MARK NEWMAN, *Primary Examiner.*

W. E. BURNS, *Assistant Examiner.*